(12) United States Patent
Lu et al.

(10) Patent No.: US 10,310,282 B2
(45) Date of Patent: Jun. 4, 2019

(54) DISPLAY DEVICE AND METHOD FOR CONTROLLING A GRATING THEREOF

(71) Applicants: Boe Technology Group Co., Ltd., Beijing (CN); Beijing Boe Optoelectronics Technology Co., Ltd., Beijing (CN)

(72) Inventors: Pengcheng Lu, Beijing (CN); Renwei Guo, Beijing (CN); Chungchun Chen, Beijing (CN); Xue Dong, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 117 days.

(21) Appl. No.: 14/912,683

(22) PCT Filed: Jul. 17, 2015

(86) PCT No.: PCT/CN2015/084280
§ 371 (c)(1),
(2) Date: Feb. 18, 2016

(87) PCT Pub. No.: WO2016/141655
PCT Pub. Date: Sep. 15, 2016

(65) Prior Publication Data
US 2017/0038649 A1    Feb. 9, 2017

Related U.S. Application Data

(63) Continuation of application No. PCT/CN2015/084280, filed on Jul. 17, 2015.

(30) Foreign Application Priority Data

Mar. 9, 2015 (CN) .......................... 2015 1 0102610

(51) Int. Cl.
*G02B 27/22* (2018.01)
*G02F 1/133* (2006.01)
(Continued)

(52) U.S. Cl.
CPC ..... *G02B 27/2214* (2013.01); *G02F 1/13306* (2013.01); *G02F 1/133512* (2013.01); *G02F 1/134336* (2013.01); *G02F 2201/52* (2013.01)

(58) Field of Classification Search
CPC ........... G02B 27/2214; G02F 1/134336; G02F 1/133512; G02F 1/13306; G02F 2201/52
See application file for complete search history.

(56) References Cited

U.S. PATENT DOCUMENTS

2007/0058113 A1    3/2007 Wu et al.
2010/0259697 A1*  10/2010 Sakamoto .......... G02B 27/2214
                                                          349/15
(Continued)

FOREIGN PATENT DOCUMENTS

CN    1708995       12/2005
CN    101344642     1/2009
(Continued)

OTHER PUBLICATIONS

Office Action from China Application No. 201510102610.7 dated Feb. 28, 2017.
(Continued)

*Primary Examiner* — Jessica M Merlin
(74) *Attorney, Agent, or Firm* — Calfee, Halter & Griswold LLP (57) ABSTRACT

The present invention provides a display device and a method for controlling a grating thereof, and belongs to the field of display technology, and can overcome the problem in which electrodes of the grating substrate require high fabricating accuracy and are difficult to fabricate due to the
(Continued)

arrangement of a pixel array. The display device at least comprises a pixel array and a grating, an odd-numbered row of sub-pixels and a neighboring even-numbered row of sub-pixels are offset in a longitudinal direction by a preset length, a first substrate of the grating comprises a plurality of electrodes, each electrode comprises a plurality of segments which are continuous and are offset in a segment-wise manner by a predefined length from an end to the other end of the electrodes. Since the pixels and the grating are arranged in a corresponding manner, the electrodes of the grating substrate have an increased width, requirements for accuracy of the process for fabricating the electrodes are reduced, and the fabrication difficulty is reduced. By turning on and off the grating, a switch of the display device between 2D and 3D display can be realized.

17 Claims, 3 Drawing Sheets

(51) Int. Cl.
  *G02F 1/1335* (2006.01)
  *G02F 1/1343* (2006.01)

(56) References Cited

U.S. PATENT DOCUMENTS

2012/0013606 A1* 1/2012 Tsai ................... G02B 27/2214
                                                      345/419
2015/0015568 A1   1/2015 Fang et al.
2015/0181202 A1*  6/2015 Niu .................... G02B 27/2214
                                                      348/54
2015/0249818 A1*  9/2015 Murao ............... G02B 27/0093
                                                      348/59

FOREIGN PATENT DOCUMENTS

| CN | 101995667   | 3/2011  |
| CN | 102253562 A | 11/2011 |
| CN | 102402011   | 4/2012  |
| CN | 102681244   | 9/2012  |
| CN | 103033973   | 4/2013  |
| CN | 103033982   | 4/2013  |
| CN | 103155569 A | 6/2013  |
| CN | 103278954   | 9/2013  |
| CN | 103389597   | 11/2013 |
| CN | 103472650   | 12/2013 |
| CN | 104041025   | 9/2014  |
| CN | 104597611   | 5/2015  |
| CN | 104635398   | 5/2015  |

OTHER PUBLICATIONS

International Search Report and Written Opinion from PCT/CN15/84280 dated Nov. 25, 2015.
Second Office Action from China Application No. 201510102610.7 dated Nov. 30, 2017.

* cited by examiner

| | R1 | R2 | R3 | R4 | R5 | R6 | R7 | R8 | R9 | R10 | R11 | R12 |
|---|---|---|---|---|---|---|---|---|---|---|---|---|
| | C1 | C2 | C3 | C4 | C5 | C6 | C7 | C8 | C9 | C10 | C11 | C12 |
| S1 | R1 | G2 | B1 | R2 | G1 | B2 | R1 | G2 | B1 | R2 | G1 | B2 |
| S2 | | B1 | R2 | G1 | B2 | R1 | G2 | B1 | R2 | G1 | B2 | R1 | G2 |
| S3 | R2 | G1 | B2 | R1 | G2 | B1 | R2 | G1 | B2 | R1 | G2 | B1 |
| S4 | | B2 | R1 | G2 | B1 | R2 | G1 | B2 | R1 | G2 | B1 | R2 | G1 |
| S5 | R1 | G2 | B1 | R2 | G1 | B2 | R1 | G2 | B1 | R2 | G1 | B2 |
| S6 | | B1 | R2 | G1 | B2 | R1 | G2 | B1 | R2 | G1 | B2 | R1 | G2 |

Fig. 5 turning on the grating by applying a same level signal to the electrodes of the second substrate and applying a high level signal or a low level signal alternately to the electrodes of the first substrate turning off the grating by applying a same level signal to the electrodes of the first substrate and the second substrate

Fig. 6

DISPLAY DEVICE AND METHOD FOR CONTROLLING A GRATING THEREOF

RELATED APPLICATIONS

The present application is the U.S. national phase entry of PCT/CN2015/084280 with an International filing date of Jul. 17, 2015, which claims the benefit of Chinese Application No. 201510102610.7, filed Mar. 9, 2015, the entire disclosures of which are incorporated herein by reference.

FIELD OF THE INVENTION

The present invention relates to the field of display technology, and particularly to a display device and a method for controlling a grating thereof.

BACKGROUND OF THE INVENTION

The principle for 3D display technology lies in that a left eye and a right eye of a viewer are made to receive different images, the left and right images are analyzed and overlapped by the brain, so that a layering effect of the image is perceived by the viewer and a stereoscopic effect is thus generated.

Currently, the 3D display device generally comprises two kinds, i.e., a display device which requires 3D glasses, and a naked-eye 3D display device. A parallax barrier technology is one of the naked-eye 3D technologies, in which a grating is generally used to form light transmitting fringes on the display panel. The grating comprises a liquid crystal layer, a first substrate and a second substrate at two sides of the liquid crystal layer, and a polarizing film. By controlling a voltage difference between the electrodes of the first substrate and the second substrate, liquid crystal molecules in the liquid crystal layer rotate to form opaque fringes, i.e., parallax barriers. When the grating is turned on, under the action of these parallax barriers, the left eye can only perceive an image which should be perceived by the left eye and should not be perceived by the right eye, and the right eye can only perceive an image which should be perceived by the right eye and should not be perceived by the left eye. When the grating is turned off, parallax barriers do not appear, so that the display panel becomes a common 2D display device.

According to the conventional parallax barrier technology, a 3D display device is based on the following arrangement. Each column of sub-pixels of the pixel array is formed by sub-pixels of three colors (i.e., red, green, blue) which are arranged in an aligned manner, and each sub-pixel is formed by sub-pixels of three colors. Thus, a display resolution of the display device is also a physical resolution thereof. As a result, in applications where the display device displays with a high PPI (pixels per inch), the sub-pixel should have a reduced size, and the corresponding parallax barriers should have electrodes of an extremely small width. Therefore, high accuracy is required for the width of electrodes, the process is difficult, and crosstalk tends to occur. The electrodes of the grating substrate are controlled in such a row-by-row and one-by-one manner that the controlling complexity is high. Furthermore, the electrodes of the grating substrate are stripes which are arranged in parallel (a regular electrode pattern), and it is prone to introduce moire effect.

SUMMARY OF THE INVENTION

It is an object of the present invention to provide an improved display device and method for controlling a grating thereof, thus overcoming or alleviating one or more problems in the prior art. For example, technical solutions of the present invention can overcome the problem in which electrodes of the grating substrate require high fabricating accuracy and are difficult to fabricate due to the arrangement of a pixel array. The present invention can further overcome the problem of high controlling complexity due to the fact that the electrodes of the grating substrate should be control row-by-row and one-by-one.

To this end, the present invention adopts the following technical solutions.

In a first aspect, the present invention provides a display device, which at least comprises a pixel array and a grating;

wherein the pixel array comprises a plurality of rows of pixels, each pixel comprises at least one sub-pixel, an odd-numbered row of sub-pixels and a neighboring even-numbered row of sub-pixels are offset in a longitudinal direction by a preset length which is smaller than a longitudinal length of a sub-pixel; and wherein the grating comprises a liquid crystal layer as well as a first substrate and a second substrate at two sides of the liquid crystal layer;

the first substrate comprises a plurality of electrodes spaced by a predefined distance, each of the electrodes comprises a plurality of segments which are continuous in the longitudinal direction and are offset in a segment-wise manner by a predefined length from an end to the other end of the electrodes; and the second substrate comprises a plurality of electrodes, the electrodes of the first substrate and the second substrate are configured to generate an electric field upon application of a voltage to control deflection of liquid crystal molecules in the liquid crystal layer.

For example, each row of sub-pixels is formed by sub-pixels of at least three colors which are arranged in a cyclic manner, each row of sub-pixels comprises sub-pixels of a same number, and each sub-pixel has a same size.

For example, the sub-pixels of each odd-numbered row are aligned with respect to their left edges, and the sub-pixels of each even-numbered row are aligned with respect to their right edges.

For example, any neighboring sub-pixel has a different color.

For example, the segments of the electrodes of the first substrate are offset to a same side of the electrodes from an end to the other end of the electrodes in a segment-wise manner by a predefined length.

For example, the segments of the electrodes of the first substrate have a same longitudinal length and a same transverse length.

For example, the electrodes of the second substrate extend in a transverse direction and are arranged in parallel by an interval.

For example, each segment of the electrodes of the first substrate has a transverse length which is larger than or equal to a transverse length of the sub-pixels; and each segment of the electrodes of the first substrate has a longitudinal length which is equal to a longitudinal length of the sub-pixels.

For example, the predefined distance between electrodes of the first substrate is equal to a transverse width of a black matrix between neighboring sub-pixels.

For example, the electrodes of the second substrate have a longitudinal width which is equal to a longitudinal length of the sub-pixels; and a distance between the electrodes of the second substrate is equal to a longitudinal width of a black matrix between neighboring sub -pixels.

For example, each segment of the electrodes of the first substrate has a transverse length which is 1-3 times a transverse length of the sub-pixels.

For example, the predefined length by which the segments of the electrodes of the first substrate are offset to a same side of the electrodes from an end to the other end of the electrodes in a segment-wise manner is smaller than a transverse length of each segment.

For example, the predefined length by which the segments of the electrodes of the first substrate are offset to a same side of the electrodes from an end to the other end of the electrodes in a segment-wise manner is ½ of the transverse length of each segment.

For example, each pixel in the pixel array comprises 1.5 or 2 sub-pixels.

For example, a ratio between a transverse length and a longitudinal length of the sub-pixels is 1:1-2:1.

For example, the electrodes of the second substrate are formed on a whole surface.

For example, each row of sub-pixels is formed by a red sub-pixel, a green sub-pixel, and a blue sub-pixel which are arranged in a cyclic manner.

For example, the preset length by which the odd-numbered row of sub-pixels is offset with respect to the even-numbered row of sub-pixels in the longitudinal direction is ½ of a longitudinal length of the sub-pixels.

In a second aspect, the present invention provides a method for controlling a grating in the above-mentioned display device, comprising:

turning on the grating by applying a same level signal to the electrodes of the second substrate and applying a high level signal or a low level signal alternately to the electrodes of the first substrate; and turning off the grating by applying a same level signal to the electrodes of the first substrate and the second substrate.

For example, the method can comprise: turning on the grating by applying a high level signal to the electrodes of the second substrate and applying a high level signal and a low level signal alternately to the electrodes of the first substrate.

The method can comprise: turning on the grating by applying a low level signal to the electrodes of the second substrate and applying a high level signal and a low level signal alternately to the electrodes of the first substrate.

For example, the method can comprise: turning off the grating by applying a high level signal to the electrodes of the first substrate and the second substrate.

The method can comprise: turning off the grating by applying a low level signal to the electrodes of the first substrate and the second substrate.

In the display device and the method for controlling a grating thereof the present invention, a grating corresponding to the arrangement of pixels is adopted, so that the electrodes of the grating substrate have an increased width, requirements for accuracy of the process for fabricating the electrodes are reduced, the process is simplified, the cost is decreased, and crosstalk is reduced effectively. Furthermore, an inclined arrangement of electrodes avoids moire effect in the grating. By turning on and off the grating, the display device is switched between 2D display and 3D display. Furthermore, the amount of the electrode control lines is saved, so that the grating has a more simple structure.

BRIEF DESCRIPTION OF THE DRAWINGS

FIG. 2 is a schematic view for illustrating a shielding of a grating on a pixel array in embodiment 1 of the present invention, in which the grating is turned on.

FIG. 4 is a schematic view for illustrating light shielding regions and light transmitting regions formed by a grating in embodiment 1 of the present invention, in which the grating is turned on.

DETAILED DESCRIPTION OF THE INVENTION

In order to make objects, technical solutions and advantages of the present invention more clear, embodiments of the present invention will be described in details hereinafter in conjunction with the accompanying drawings.

Embodiment 1

As shown in FIGS. 1-5, the present embodiment provides a display device, which at least comprises a pixel array and a grating.

Figure 1:
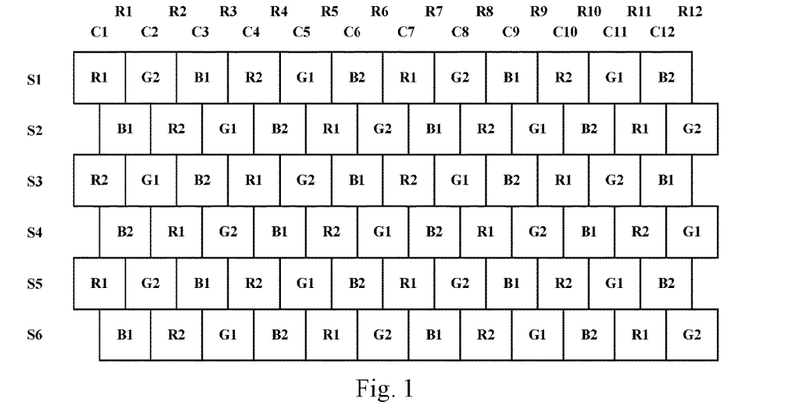
FIG. 1 is a schematic view for illustrating arrangement of a pixel array in embodiment 1 of the present invention.

The pixel array comprises a plurality of rows of pixels, and each pixel comprises at least one sub-pixel.

Each row of sub-pixels is formed by sub-pixels of at least three colors which are arranged in a cyclic manner, each row of sub-pixels comprises sub-pixels of a same number, and each sub-pixel has a same size.

The sub-pixels of each odd-numbered row are aligned with respect to their left edges, sub-pixels of each even-numbered row are aligned with respect to their right edges, and an odd-numbered row of sub-pixels and an even-numbered row of sub-pixels are offset in a longitudinal direction by a preset length which is smaller than a longitudinal length of a sub-pixel.

Any neighboring sub-pixel has a different color.

Figure 3:
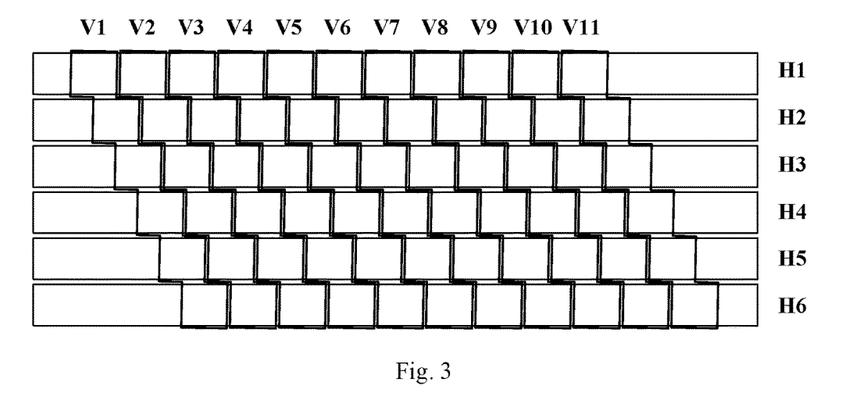
FIG. 3 is a structural view for illustrating a grating in embodiment 1 of the present invention.

The grating comprises a liquid crystal layer as well as a first substrate and a second substrate at two sides of the liquid crystal layer.

The first substrate comprises a plurality of electrodes spaced by a predefined distance, each of the electrodes comprises a plurality of segments which are continuous in the longitudinal direction and are offset to a same side of the electrodes from an end to the other end of the electrodes in a segment-wise manner by a predefined length, and segments of the electrodes have a same longitudinal length and a same transverse length.

The second substrate comprises a plurality of electrodes which extend in a transverse direction and are arranged in parallel by an interval.

Electrodes of the first substrate and the second substrate are configured to generate an electric field for controlling deflection of liquid crystal molecules in the liquid crystal layer.

In the display device of the present embodiment, a grating corresponding to the arrangement of pixels is adopted, so that the electrodes of the grating substrate have an increased width, requirements for accuracy of the process for fabricating the electrodes are reduced, the process is simplified, the cost is decreased, and crosstalk is reduced effectively. Furthermore, an inclined arrangement of electrodes avoids moire effect in the grating.

In particular, the present invention does not intend to limit the number of pixel rows in the pixel array. In implementations, the number of pixel rows can be determined by the size of screen, a physical resolution of the display device, and the size of each sub-pixel. For example, the pixel array can comprise 6 rows of pixels or the like. The present invention does not intend to limit the number of pixels in each row. For example, each row of pixels comprises 12 pixels.

Regardless of the number of pixels in each row, each pixel can comprise at least one sub-pixel. For example, a pixel can comprise 1 sub-pixel, 1.5 sub-pixels, 2 sub-pixels, or the like. Further, since the pixel array comprises a plurality of rows of pixels, and each pixel comprises at least one sub-pixel, the pixel array comprises a plurality of rows of sub-pixels. Further, each sub-pixel has a same size indicates that each sub-pixel has a same transverse length and longitudinal length.

Each sub-pixel in the pixel array can emit light of a desired color independently. The sub-pixels are generally controlled by a TFT array, each sub-pixel corresponds to at least one TFT, and each TFT are arranged in an array and controlled by gate lines and data lines.

In practical applications, the display device can be OLED (organic light-emitting diode), an organic light-emitting diode is arranged at each sub-pixel, and the respective sub-pixel emits light of a desired color directly by means of the organic light-emitting diode. For example, a red sub-pixel can emit red light by means of the organic light-emitting diode.

Further, the display device can also be a liquid crystal display device, the respective sub-pixel comprises a filter unit, and the light passing the filter unit of respective sub-pixel has a color corresponding to colors of three kinds of sub-pixels. In particular, a color filter film of different color at each sub-pixel, and the light passing the color filter film can be converted into a corresponding color. The color filter film at respective sub-pixel has a same color as that of the sub-pixel. For example, the color filter film at a red sub-pixel has a red color.

In the present embodiment, the pixel array can comprise sub-pixels of three colors. For example, the pixel array comprises red sub-pixels R, blue sub-pixels B, and green sub-pixels G. Of course, the pixel array can also comprise sub-pixels of four colors. For example, the pixel array comprises red sub-pixels R, blue sub-pixels B, green sub-pixels G, and complementary color sub-pixels W. The present invention intends to limit neither the type of colors for sub-pixels in the pixel array, nor the specific color of complementary color sub-pixels W.

During arranging each row of sub-pixels in the pixel array of the present embodiment, sub-pixels of various colors can be arranged in a cyclic manner. In particular, each row of sub-pixels is formed by sub-pixels of at least three colors which are arranged in a cyclic manner. For example, in case the pixel array comprises red sub-pixels R, blue sub-pixels B, and green sub-pixels G, each row of sub-pixels can be formed by red sub-pixels R, blue sub-pixels B, and green sub-pixels G which are arranged in a cyclic manner.

In order to provide a regular pixel array, each row of sub-pixels comprises sub-pixels of a same number. As shown in FIG. 1, each row of sub-pixels can comprise 12 sub-pixels. Further, in the present embodiment, by setting each column of sub-pixels to comprise sub-pixels of a same number, each sub-pixel can share its neighboring sub-pixels, thus avoiding a case in which a sub-pixel can not display normally due to failure in sharing a neighboring sub-pixel of other colors.

The expression "the sub-pixels of each odd-numbered row are aligned with respect to their left edges" refers to a case in which all odd-numbered rows of sub-pixels in a same column flush with each other in a vertical direction, and the expression "sub-pixels of each even-numbered row are aligned with respect to their right edges" refers to a case in which all even-numbered rows of sub-pixels in a same column flush with each other in a vertical direction. For example, a sub-pixel at a first row and a first column flush in the vertical direction with a sub-pixel at a third row and the first column.

The preset length by which the odd-numbered row of sub-pixels is offset with respect to the even-numbered row of sub-pixels in the transverse direction, can be ½, ⅓ of the transverse length of a sub-pixel, provided that the preset length is smaller than the transverse length of the sub-pixel. As shown in FIG. 1, any even-numbered row of sub-pixels can be offset to the right side in the transverse direction by ½ of the transverse length of the sub-pixel with respect to any odd-numbered row of sub-pixels.

Further, as for any sub-pixel, the sub-pixel has a color different from that of any neighboring sub-pixel. In particular, the sub-pixel has a color different from that of the left, right, upper, lower neighboring sub-pixels. To ensure any neighboring sub-pixel has a different color, the odd-numbered row of sub-pixels and the even-numbered row of sub-pixels can be arranged in a different manner. In particular, in case each row of sub-pixels is formed by a red sub-pixel, a green sub-pixel, and a blue sub-pixel which are arranged in a cyclic manner, the odd-numbered row of sub-pixels and the even-numbered row of sub-pixels can be arranged in the following manners.

In a first manner, the odd-numbered row of sub-pixels can be arranged as B-G-R-B . . . , and the even-numbered row of sub-pixels can be arranged as G-R-B-G . . . .

In a second manner, the odd-numbered row of sub-pixels can be arranged as B-R-G-B . . . , and the even-numbered row of sub-pixels can be arranged as R-G-B-R . . . .

In a third manner, the odd-numbered row of sub-pixels can be arranged as G-B-R-G . . . , and the even-numbered row of sub-pixels can be arranged as B-R-G-B . . . .

In a fourth manner, the odd-numbered row of sub-pixels can be arranged as G-R-B-G . . . , and the even-numbered row of sub-pixels can be arranged as R-B-G-R . . . , as shown in FIG. 1.

In a fifth manner, the odd-numbered row of sub-pixels can be arranged as R-B-G-R . . . , and the even-numbered row of sub-pixels can be arranged as B-G-R-B . . . .

In a sixth manner, the odd-numbered row of sub-pixels can be arranged as R-G-B-R . . . , and the even-numbered row of sub-pixels can be arranged as G-B-R-G . . . .

To enable the displayed image to present a 3D effect, light shielding regions of the grating shield some regions of the pixel array, and the displayed image is divided into a plurality of views, so that different views are projected into different eyes of the viewer, thus presenting the 3D display effect. For example, the displayed image can be divided into a left view (R1, G1, B1 in FIG. 1) and a right view (R2, G2, B2 in FIG. 1) by means of the light shielding regions and light transmitting regions of the grating, the left view is projected into the left eye of the viewer, and the right view is projected into the right eye of the viewer, so that the displayed image presents the 3D effect.

Further, it is possible to extend the above left and right views into 4 views (e.g., by adding views in two diagonal directions).

In the display device of the present invention, each row of sub-pixels in the pixel array is formed by sub-pixels of at least three colors which are arranged in a cyclic manner, the odd-numbered row of sub-pixels and the even-numbered row of sub-pixels are offset by a preset length in the transverse direction, and any neighboring sub-pixel has a different color. As a result, a sub-pixel together with its neighboring two sub-pixels in a same row forms a delta structure. In this way, when an image is displayed by the pixel array, a sub-pixel can share its neighboring sub-pixels, and can also be shared by its neighboring sub-pixels to form three primary colors, so that various colors can be displayed, the display resolution is larger than the physical resolution, PPI of the display device is improved, and thus the 3D display effect is improved.

On basis of the above-mentioned embodiment, FIG. 1 shows a schematic view for a pixel array in an embodiment of the present invention. The pixel array is formed by 6 rows of sub-pixels, and each pixel comprises 1.5 sub-pixels. Each row of sub-pixels is formed by a red sub-pixel, a green sub-pixel, and a blue sub-pixel which are arranged in a cyclic manner. An odd-numbered row of sub-pixels the pixel array refers to a first row of sub-pixels, a third row of sub-pixels, a fifth row of sub-pixels, and an even-numbered row of sub-pixels refers to a second row of sub-pixels, a fourth row of sub-pixels, a sixth row of sub-pixels. All odd-numbered rows of sub-pixels are aligned with respect to their left edges, all even-numbered row of sub-pixels are aligned with respect to their right edges, and a preset length by which the odd-numbered row of sub-pixels is offset with respect to the even-numbered row of sub-pixels in the transverse direction is ½ of a transverse length of a sub-pixel. Any neighboring sub-pixel in the pixel array has a different color.

In FIG. 1, the odd-numbered row of sub-pixels is arranged as R-G-B-R . . . , and the even-numbered row of sub-pixels is arranged as B-R-G-B . . . . Further, by taking a blue sub-pixel at S2R4 in FIG. 1 as an example, the blue sub-pixel has a different color from its upper, lower, left, and right neighboring sub-pixels. Each sub-pixel together with its two neighboring sub-pixels in a same column forms a delta structure. By taking a blue sub-pixel at S2R1 in FIG. 1 as an example, the blue sub-pixel together with a red sub-pixel at S3C1 and a green sub-pixel at S3C2 forms a delta structure.

It is noted that, in drawings and specification, the number following S in reference numerals like S2R1, S3C1, S3C2 indicates a row in which the sub-pixel is located, the number following R indicates a column in which the even-numbered row of sub-pixels is located, and the number following C indicates a column in which the odd-numbered row of sub-pixels is located. In drawings, each sub-pixel is labeled with a combination of a letter (R, G, B) and a number (1, 2), and the letter in this combination is used to indicate the color of the sub-pixel. For example, R is used to indicate the sub-pixel is a red sub-pixel, G is used to indicate the sub-pixel is a green sub-pixel, and B is used to indicate the sub-pixel is a blue sub-pixel. For example, a sub-pixel R2 at S3C1 is a red sub-pixel. In this combination for respective sub-pixel, the number "1" indicates the sub-pixel is allocated to a first view, and the number "2" indicates the sub-pixel is allocated to a second view.

The light shielding regions and light transmitting regions of the grating can have a shape of grid, strip or the like. By means of the light shielding regions and light transmitting regions of the grating of different shapes, the light can be controlled to propagate in different directions, and thus the grating enables different views. The light shielding regions and light transmitting regions of the grating have a shape of vertical stripe. In case some regions of the pixel array are shielded by the grating of such a structure, the display device can divide the displayed image into a left view and a right view, and the left view and right view are directed to the left eye and right eye of a user respectively, thus enabling a 3D display of two views. The 3D display of two views has a simple fabricating process and is easy to implement.

For example, in the grating of the present invention, the image displayed by sub-pixels labeled by 1 in the above combination is allocated to the left view, and the image displayed by sub-pixels labeled by 2 in the above combination is allocated to the right view.

For example, the light shielding regions of the grating can shield sub-pixels labeled by 1 in the combination in the pixel array which are offset row-by-row to a bottom right direction, and project light of the sub-pixels to the left side at a certain angle to form the left view. Similarly, the light shielding regions shield sub-pixels labeled by 2 in the combination which are offset row-by-row to the bottom right direction, and project light of the sub-pixels to the right side at a certain angle to form the right view.

Of course, the light shielding regions of the grating can shield a portion of the sub-pixels in the pixel array which are offset downward row-by-row, and form the left view and right view at a corresponding angle. For example, in order to reduce crosstalk between views which reach the left eye and right eye of the user, to present a uniform 3D image, the light shielding regions can be a half region of the sub-pixels.

In particular, the light shielding regions of the grating can shield two neighboring sub-pixels which are offset downward row-by-row in the pixel array, so that a right half region of the sub-pixels at the left side in each row and a left half region of the sub-pixels at the right side are shielded. In this case, the light transmitting regions of the grating correspond to the left half region of the left side sub-pixel and the right half region of the right side sub-pixel in each row of two neighboring sub-pixels. Of course, in contrast, the light shielding regions can shield the left half region of the left side sub-pixel and the right half region of the right side sub-pixel in each row of two neighboring sub-pixels, and the light transmitting regions correspond to the right half region of the left side sub-pixel and the left half region of the right side sub-pixel in each row of two neighboring sub-pixels.

Figure 2:
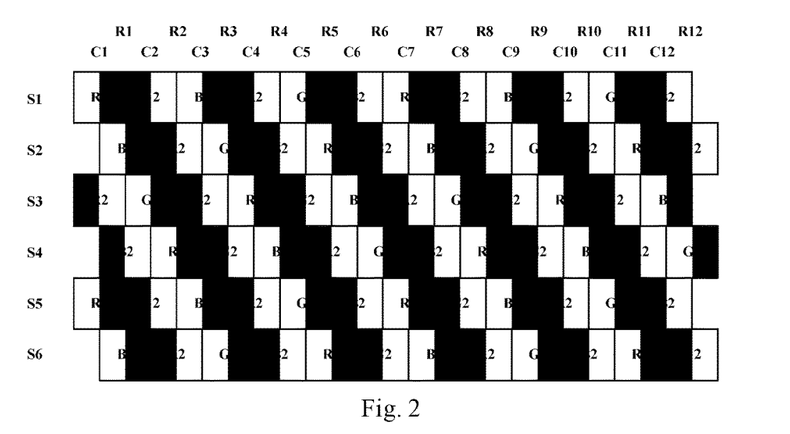

In particular, FIG. 2 shows a relationship between the pixel array and the light shielding regions of the grating. As shown, the light shielding regions of the grating shield two neighboring sub-pixels which are offset downward row-by-row in the pixel array, so that the right half region of the left side sub-pixel and the left half region of the right side sub-pixel in each row are shielded.

In another embodiment, during setting the size of each sub-pixel in the pixel array, a ratio between a transverse length and a longitudinal length of each sub-pixel can be controlled. The ratio between the transverse length and the longitudinal length of each sub-pixel can be set in a range of 1:1-2:1. For example, the ratio can be 1:1, 1.5:1 or 2:1.

Still referring to FIG. 1, the transverse direction mentioned in embodiments of the present invention refers to the left-right direction in FIG. 1, and the longitudinal direction refers to the up-down direction in FIG. 1. As shown in FIG. 2, the ratio between the transverse length and the longitudinal length of each sub-pixel is exemplarily set to 1:1. In case the transverse length of each sub-pixel is 1 cm, the longitudinal length of each sub-pixel can be set to 1 cm.

In the pixel array shown in FIG. 1, the ratio between the transverse length and the longitudinal length of each sub-pixel is 1:1.

The ratio between the transverse length and the longitudinal length of each sub-pixel can be set in a range of 1:1-2:1, or directly set to 2:1. In both cases, it is ensures that each sub-pixel has a relatively large length in the transverse direction, thus facilitating its fabrication.

In this way, during forming an electrode on the first substrate which corresponds to the transverse width of the sub-pixels, the electrode has a width which is increased accordingly, thus facilitating fabrication and reducing cost.

The optional technical solutions as mentioned above can be combined in any manner to develop optional embodiments of the present invention, which are not described here for simplicity.

On basis of the pixel arrangement manner described above, the present embodiment provides a grating structure, which is described hereinafter by taking a grating structure for a panel in a landscape mode as an example. It is understood that the grating structure is also applicable to a panel in a portrait mode.

The grating can comprise a liquid crystal layer (not shown) as well as a first substrate and a second substrate at two sides of the liquid crystal layer. It is understood that the first substrate can be an upper substrate or a lower substrate, and the second substrate can be the lower substrate or the upper substrate.

The first substrate comprises a plurality of electrodes spaced by a predefined distance, as shown by V1-V11 in FIG. 3. As shown, each of the electrodes comprises a plurality of segments which are continuous in the longitudinal direction. Segments of the electrodes are offset to a same side of the electrodes from an end to the other end of the electrodes in a segment-wise manner by a predefined length. Segments of the electrodes have a same longitudinal length and a same transverse length. As shown in FIG. 3, V1 is an electrode formed by 6 segments which are offset by ½ of the transverse length in a segment-wise manner to the bottom right direction.

The second substrate comprises a plurality of electrodes which extend in the transverse direction and are arranged in parallel by an interval, as shown by H1-H6 in FIG. 3.

Electrodes of the first substrate and the second substrate are configured to generate an electric field for controlling deflection of liquid crystal molecules in the liquid crystal layer, thus shielding and transmitting light.

For example, each segment of the electrodes of the first substrate has a transverse length which is larger than or equal to the transverse length of the sub-pixels, and has a longitudinal length which is equal to the longitudinal length of the sub-pixels.

The electrodes of the first substrate are spaced by a predefined distance which is equal to the transverse width of a black matrix between neighboring sub-pixels.

The electrodes of the second substrate have a longitudinal width which is equal to the longitudinal length of the sub-pixels.

The electrodes of the second substrate are spaced by a distance which is equal to the longitudinal width of the black matrix between neighboring sub-pixels.

For example, each segment of the electrodes of the first substrate has a transverse length which is 1-3 times the transverse length of the sub-pixels. In this way, the width of electrodes of the first substrate can be further increased, thus facilitating fabrication and reducing cost.

A grating corresponding to the arrangement of pixels is adopted, so that electrodes on the substrate of the grating has an increased width, requirements for accuracy of the process for fabricating the electrodes are reduced, the process is simplified, the cost is decreased, and crosstalk is reduced effectively; Furthermore, an inclined arrangement of electrodes avoids moire effect in the grating.

For example, the predefined length by which segments of the electrodes are offset to a same side of the electrodes from an end to the other end of the electrodes in a segment-wise manner is smaller than the transverse length of each segment. The offset length can be modified as needed.

For example, the predefined length by which segments of the electrodes are offset to a same side of the electrodes from an end to the other end of the electrodes in a segment-wise manner is ½ of the transverse length of each segment, as shown in FIG. 3. Of course, the electrodes can also be offset to the bottom left direction in a segment-wise manner.

Embodiment 2

Figure 6:
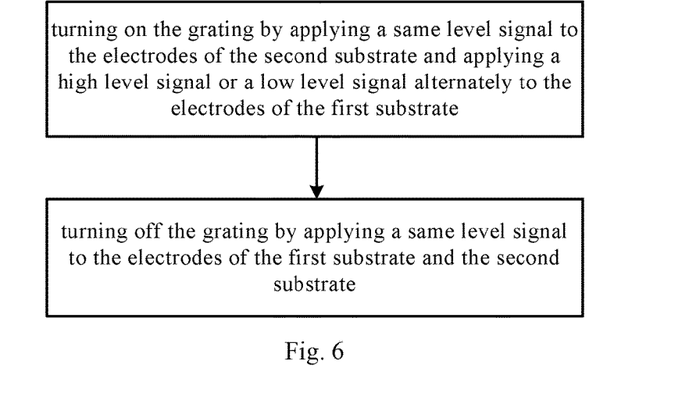
FIG. 6 is a schematic flow chart for illustrating a grating controlling method in embodiment 2 of the present invention.

FIG. 6 is a schematic flow chart for illustrating a grating controlling method in embodiment 2 of the present invention.

In the present embodiment, a method for controlling a grating of a display device comprises: turning on the grating by applying a same level signal to the electrodes of the second substrate and applying a high level signal or a low level signal alternately to the electrodes of the first substrate; and by applying a same level signal to the electrodes of the first substrate and the second substrate, turn off the grating.

For example, the method can comprise: turning on the grating by applying a high level signal to the electrodes of the second substrate and applying a high level signal and a low level signal alternately to the electrodes of the first substrate. The method can comprise: turning on the grating by applying a low level signal to the electrodes of the second substrate and applying a high level signal and a low level signal alternately to the electrodes of the first substrate.

For example, the method can comprise: turning off the grating by applying a high level signal to the electrodes of the first substrate and the second substrate. The method can comprise: turning off the grating by applying a low level signal to the electrodes of the first substrate and the second substrate.

In particular, the present embodiment provides a method for controlling a grating in the above-mentioned display device, which comprises turning on and off the grating, wherein turning on the grating comprises: during applying a high level signal to the electrodes of the second substrate, applying a high level signal and a low level signal alternately to the electrodes of the first substrate; or, during applying a low level signal to the electrodes of the second substrate, applying a high level signal and a low level signal to the electrodes of the first substrate alternately. In this way, in case the grating is turned on, light shielding regions and light transmitting regions can be formed alternately on the pixel array, the pixel display region is divided into views for left and right eyes (or more views) to achieve 3D display. Since the first substrate can be supplied with a same signal, i.e., only one signal control line is needed, the amount of the electrode control lines is saved, so that the grating has a more simple structure (the electrodes of the first substrate are formed a whole surface).

By turning on of the grating, a 3D display is realized. Turning on the grating comprises: during applying a high level signal to the electrodes of the second substrate, applying a high level signal and a low level signal alternately to the electrodes of the first substrate; or, during applying a low level signal to the electrodes of the second substrate, applying a high level signal and a low level signal alternately to the electrodes of the first substrate.

In particular, in case a high level signal and a low level signal are applied to two neighboring electrodes of the first substrate, there are two optional controlling methods as follow.

In the first controlling method, when V1, V3, V5, V7, V9, V11 are subject to a low level, and H1-H6 are subject to a low level, a voltage difference is not present between these upper and lower electrodes, and liquid crystal molecules do not rotate for transmit light normally. When V2, V4, V6, V8, V10 are subject to a high level, and H1-H6 are subject to a low level, a voltage difference is present between these upper and lower electrodes, so that liquid crystal molecules rotate by 90° and do not transmit light.

Figure 4:
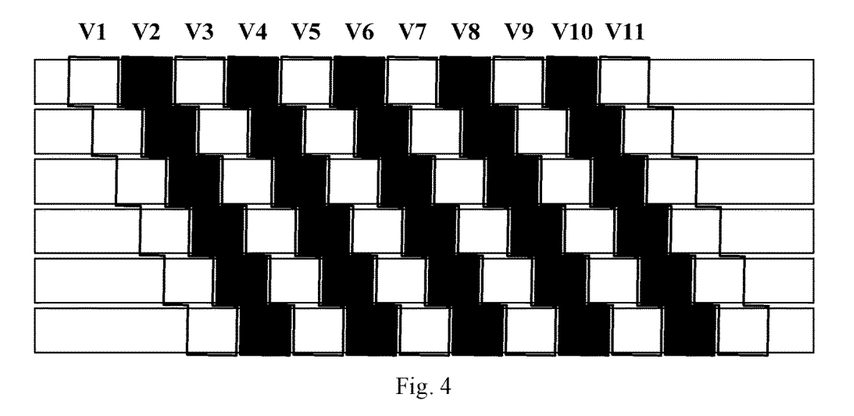

The display effect of the grating is shown in FIG. 4, and an effect similar to the light shielding regions (shadow regions) and light transmitting regions (non-shadow regions) of the grating in FIG. 2 is formed on the pixel array. A half of the sub-pixels is shielded, and the other half is light transmitting.

In the second controlling method, similarly, when V1, V3, V5, V7, V9, V11 are subject to a high level, and H1-H6 are subject to a high level, a voltage difference is not present between these upper and lower electrodes, liquid crystal molecules do not rotate and transmit light normally. When V2, V4, V6, V8, V10 are subject to a low level, and H1-H6 are subject to a high level, a voltage difference is present between these upper and lower electrodes, so that liquid crystal molecules rotate by 90° and do not transmit light.

The display effect of the grating is shown in FIG. 4, and an effect similar to the light shielding regions and light transmitting regions of the grating in FIG. 2 is formed on the pixel array. A half of the sub-pixels is shielded, and the other half is light transmitting.

Both manners for turning on the grating as described above have the following feature: all electrodes of the second substrate maintain a same level signal, i.e., all electrodes are subject to either a low level signal or a high level signal.

Figure 5:
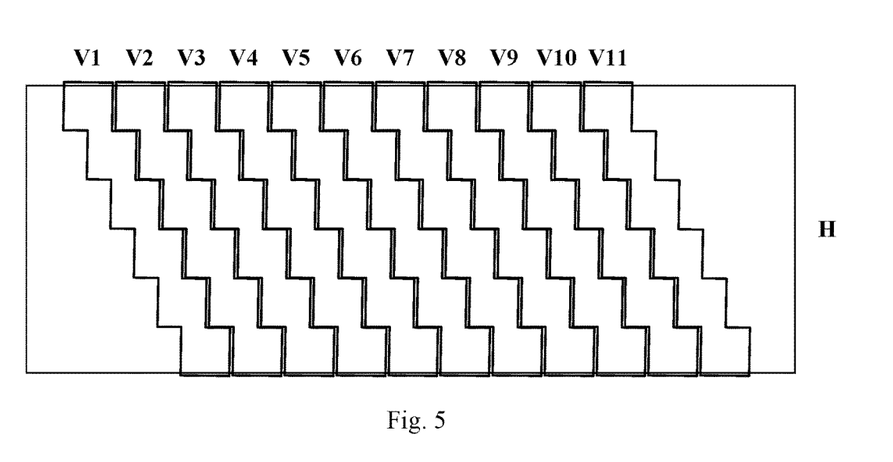
FIG. 5 is a structural view for illustrating a grating in embodiment 1 of the present invention, in which a second substrate is formed on a whole surface.

On basis of the above feature of the manners for turning on the grating, the grating can for example have such a structure that the electrodes of the second substrate are formed on a whole surface. In this way, requirements for accuracy of the fabricating process are significantly reduced, and the cost is saved. Furthermore, since only one control data line is needed, the number of control lines and the difficulty in controlling are reduced. As shown in FIG. 5, a planar electrode H is formed on a whole surface of the second substrate.

Turning off the grating comprises: applying a high level signal or a low level signal to the electrodes of the first substrate and the second substrate simultaneously.

By turning off the grating in this way, a 2D image is displayed by the pixel array. Therefore, the display device can be switched between 2D and 3D display by turning off and on the grating.

Although the present invention has been described above with reference to specific embodiments, it should be understood that the limitations of the described embodiments are merely for illustrative purpose and by no means limiting. Instead, the scope of the invention is defined by the appended claims rather than by the description, and all variations that fall within the range of the claims are intended to be embraced therein. Thus, other embodiments than the specific ones described above are equally possible within the scope of these appended claims.

The invention claimed is:

1. A display device, wherein the display device at least comprises a pixel array and a grating;
   wherein the pixel array comprises a plurality of rows of pixels, each pixel comprises at least one sub-pixel, an odd-numbered row of sub-pixels and a neighboring even-numbered row of sub-pixels are offset in a transverse direction by a preset length which is ½ of a transverse length of the sub-pixels; and
   wherein the grating comprises a liquid crystal layer as well as a first substrate and a second substrate at two sides of the liquid crystal layer;
   the first substrate comprises a plurality of electrodes spaced by a predefined distance, each of the electrodes comprises a plurality of segments which are continuous in the longitudinal direction and are offset in a segment-wise manner by a predefined length from an end to the other end of the electrodes, the predefined length being ½ of the transverse length of each segment; and
   the second substrate comprises a plurality of electrodes, the electrodes of the first substrate and the second substrate are configured to generate an electric field upon application of a voltage to control deflection of liquid crystal molecules in the liquid crystal layer to form light shielding regions and light transmitting regions of the grating, wherein the light shielding regions shield two neighboring sub-pixels which are offset downward row-by-row in the pixel array, the right half region of the left side sub-pixel and the left half region of the right side sub-pixel in each row are shielded, and the light transmitting regions correspond to the left half region of the left side sub-pixel and the right half region of the right side sub-pixel in each row of two neighboring sub-pixels.

2. The display device of claim 1, wherein each row of sub-pixels is formed by sub-pixels of at least three colors which are arranged in a cyclic manner, each row of sub-pixels comprises sub-pixels of a same number, and each sub-pixel has a same size.

3. The display device of claim 1, wherein the sub-pixels of each odd-numbered row are aligned with respect to their left edges, and the sub-pixels of each even-numbered row are aligned with respect to their right edges.

4. The display device of claim 1, wherein any neighboring sub-pixel has a different color.

5. The display device of claim 1, wherein the segments of the electrodes of the first substrate are offset to a same side of the electrodes from an end to the other end of the electrodes in a segment-wise manner by a predefined length.

6. The display device of claim 1, wherein the segments of the electrodes of the first substrate have a same longitudinal length and a same transverse length.

7. The display device of claim 1, wherein the electrodes of the second substrate extend in the transverse direction and are arranged in parallel by an interval.

8. The display device of claim 6, wherein each segment of the electrodes of the first substrate has a transverse length which is larger than or equal to a transverse length of the sub-pixels; and
   each segment of the electrodes of the first substrate has a longitudinal length which is equal to a longitudinal length of the sub-pixels.

9. The display device of claim 1, wherein the predefined distance between electrodes of the first substrate is equal to a transverse width of a black matrix between neighboring sub-pixels.

10. The display device of claim 1, wherein the electrodes of the second substrate have a longitudinal width which is equal to a longitudinal length of the sub-pixels; and
   a distance between the electrodes of the second substrate is equal to a longitudinal width of a black matrix between neighboring sub-pixels.

11. The display device of claim 1, wherein the transverse length of each segment of the electrodes of the first substrate is not more than 3 times the transverse length of the sub-pixels.

12. The display device of claim 1, wherein each pixel in the pixel array comprises 1.5 or 2 sub-pixels.

13. The display device of claim 1, wherein a ratio between a transverse length and a longitudinal length of the sub-pixels is 1:1-2:1.

14. The display device of claim 1, wherein the electrodes of the second substrate are formed on a whole surface.

15. A method for controlling a grating in a display device, wherein the display device at least comprises a pixel array and a grating;
   wherein the pixel array comprises a plurality of rows of pixels, each pixel comprises at least one sub-pixel, an odd-numbered row of sub-pixels and a neighboring even-numbered row of sub-pixels are offset in a transverse direction by a preset length which is ½ of a transverse length of the sub-pixels; and
   wherein the grating comprises a liquid crystal layer as well as a first substrate and a second substrate at two sides of the liquid crystal layer;
   the first substrate comprises a plurality of electrodes spaced by a predefined distance, each of the electrodes comprises a plurality of segments which are continuous in the longitudinal direction and are offset in a segment-wise manner by a predefined length from an end to the other end of the electrodes, the predefined length being ½ of the transverse length of each segment, and each segment of the electrodes of the first substrate has a transverse length which is larger than a transverse length of the sub-pixels; and
   the second substrate comprises a plurality of electrodes, the electrodes of the first substrate and the second substrate are configured to generate an electric field upon application of a voltage to control deflection of liquid crystal molecules in the liquid crystal layer
   wherein the method comprises:
   turning on the grating by applying a same level signal to the electrodes of the second substrate and applying a high level signal or a low level signal alternately to the electrodes of the first substrate, to form light shielding regions and light transmitting regions of the grating, wherein the light shielding regions shield two neighboring sub-pixels which are offset downward row-by-row in the pixel array, the right half region of the left side sub-pixel and the left half region of the right side sub-pixel in each row are shielded, and the light transmitting regions correspond to the left half region of the left side sub-pixel and the right half region of the right side sub-pixel in each row of two neighboring sub-pixels; and
   turning off the grating by applying a same level signal to the electrodes of the first substrate and the second substrate.

16. The method of claim 15, wherein the method comprises:
   turning on the grating by applying a high level signal to the electrodes of the second substrate and applying a high level signal and a low level signal alternately to the electrodes of the first substrate; or
   turning on the grating by applying a low level signal to the electrodes of the second substrate and applying a high level signal and a low level signal alternately to the electrodes of the first substrate.

17. The method of claim 15, wherein the method comprises:
   turning off the grating by applying a high level signal to the electrodes of the first substrate and the second substrate; or
   turning off the grating by applying a low level signal to the electrodes of the first substrate and the second substrate.

* * * * *